(12) United States Patent
Steidl et al.

(10) Patent No.: US 7,825,210 B2
(45) Date of Patent: Nov. 2, 2010

(54) AQUEOUS, HIGHLY CROSS-LINKED TWO-COMPONENT POLYURETHANE COATING SYSTEM, METHOD FOR THE PRODUCTION AND USE THEREOF

(75) Inventors: Norbert Steidl, Kienberg (DE); Alois Maier, Engelsberg (DE); Franz Wolfertstetter, Palling (DE)

(73) Assignee: Construction Research & Technology GmbH, Trostberg (DE)

( * ) Notice: Subject to any disclaimer, the term of this patent is extended or adjusted under 35 U.S.C. 154(b) by 821 days.

(21) Appl. No.: 10/830,743

(22) Filed: Apr. 23, 2004

(65) Prior Publication Data

US 2005/0027092 A1    Feb. 3, 2005

Related U.S. Application Data

(63) Continuation of application No. PCT/EP02/11870, filed on Oct. 23, 2002.

(30) Foreign Application Priority Data

Oct. 25, 2001    (DE)    ................. 101 52 723

(51) Int. Cl.
*C08G 18/30*    (2006.01)
*C08G 18/40*    (2006.01)
*C08G 18/08*    (2006.01)

(52) U.S. Cl. .............. 528/71; 528/60; 528/85; 524/591; 524/839; 524/840

(58) Field of Classification Search ......... 524/591, 524/839, 840; 528/60, 71, 85
See application file for complete search history.

(56) References Cited

U.S. PATENT DOCUMENTS

| | | | |
|---|---|---|---|
| 4,558,090 A * | 12/1985 | Drexler et al. .............. | 524/591 |
| 5,047,294 A * | 9/1991 | Schwab et al. ........... | 428/423.1 |
| 5,710,209 A * | 1/1998 | Blum et al. ................. | 524/591 |
| 6,426,414 B1 | 7/2002 | Laas et al. | |
| 6,566,444 B1 * | 5/2003 | Gobel et al. ................ | 524/589 |
| 2004/0192835 A1 * | 9/2004 | Steidl et al. ................. | 524/591 |

FOREIGN PATENT DOCUMENTS

| | | |
|---|---|---|
| DE | 4101527 A1 | 7/1992 |
| DE | 19524046 A1 | 1/1997 |
| DE | 19619545 A1 | 11/1997 |
| DE | 19822842 A1 | 11/1999 |
| DE | 19822890 A1 | 11/1999 |
| DE | 19929784 A1 | 1/2001 |
| EP | 0204938 A1 | 12/1986 |
| EP | 0358979 A2 | 3/1990 |
| EP | 0496204 A2 | 7/1992 |
| EP | 0557844 A1 | 9/1993 |
| EP | 0742239 A1 | 11/1996 |
| EP | 0839846 A1 | 5/1998 |
| EP | 0934963 A1 | 8/1999 |
| EP | 0959086 A1 | 11/1999 |
| EP | 0959115 A1 | 11/1999 |
| WO | 97/45475 A1 | 12/1997 |

* cited by examiner

*Primary Examiner*—Milton I Cano
*Assistant Examiner*—Benjamin J Gillespie
(74) *Attorney, Agent, or Firm*—Fitch, Even, Tabin & Flannery

(57) ABSTRACT

An aqueous highly cross-linked two-component polyurethane coating system is described with reduced hydrophilicity and improved resistance to chemicals which can be obtained by a) producing a binder component based on an aqueous solution or dispersion of low-molecular hydroxy-functional and/or aminofunctional oligourethanes or polyurethanes and b) by subsequently reacting the binder component a) with a cross-linking component (H) in a ratio of 3:1 to 5:1, wherein water-dispersible polyisocyanates are used as the cross-linking component (H).

41 Claims, No Drawings

AQUEOUS, HIGHLY CROSS-LINKED TWO-COMPONENT POLYURETHANE COATING SYSTEM, METHOD FOR THE PRODUCTION AND USE THEREOF

This is a continuation of prior International application No. PCT/EP02/11870, filed Oct. 23, 2002, designating the United States of America, claiming priority from German patent application No. 10152723.3, filed Oct. 25, 2001. International application No. PCT/EP02/11870 is hereby incorporated by reference in its entirety.

The present invention concerns an aqueous highly cross-linked two-component polyurethane coating system based on an aqueous solution or dispersion of low-molecular hydroxy-functional and/or aminofunctional oligourethanes or polyurethanes as a binder component and water-emulsifiable polyisocyanates as a cross-linking component, a method for the production and use thereof.

Aqueous and water-based polyurethanes are a class of binders that have been known for over 40 years. The property profile of water-based polyurethanes has been continuously improved in the past decades as shown by an impressive number of publications in this subject area. With regard to the chemistry and technology of water-based polyurethanes reference is made to D. Dieterich, K. Uhlig in *Ullmann's Encyclopedia of Industrial Chemistry, Sixth Edition* 2001 *Electronic Release.* Wiley-VCH; D. Dieterich in *Houben-Weyl, "Methoden der Organischen Chemie".* Vol. E20, H. Bartl, J. Falbe (editor), Georg Thieme Verlag, Stuttgart 1987, p. 1641ff.; D. Dieterich, Prog. Org. Coat. 9 (1981) 281-330; J. W. Rosthauser, K. Nachtkamp, Journal of Coated Fabrics 16 (1986) 39-79; R. Arnoldus, Surf. Coat. 3 (Waterborne Coat.) (1990), 179-98.

Increasing importance has been attached to the ecological aspects of coating technology in recent years also with regard to meeting existing emission guidelines. In this connection particular priority is given to reducing the amounts of volatile organic solvents (VOC, volatile organic compounds) used in the coating systems. Up to now almost the only way to process chemically post-cross-linking polyurethane systems which are of major importance due to their outstanding properties in coating systems, has been to use organic solvents.

Thus for a long time it was assumed that water-based polyurethane systems could not be cross-linked with polyisocyanates since they react with water to form carbamic acid and are converted in a second reaction step in which carbon dioxide is eliminated to form the amine which reacts with additional isocyanate to form urea. In addition to the generation of carbon dioxide which can lead to reaction bubbles in the film, the formation of urea can result in film opacity.

This problem was not solved until the development of hydrophilically modified polyisocyanates by reaction with polyethylene glycols. Polyisocyanates based on hexamethylene diisocyanate (HDI) are mainly used due to their low viscosity. These hydrophilically modified polyisocyanate hardeners can be manually worked into aqueous systems without requiring elaborate apparatus due to their self-emulsifying properties which is of decisive importance for the reliability of the application and the level of optical properties of such coating systems.

Water-emulsifiable polyisocyanates in which the hydrophilizing group is not covalently bound to the polyisocyanate are now also being offered using an external surfactant technology.

In connection with these water-emulsifiable polyisocyanate systems, aqueous, low-cosolvent or extremely VOC-reduced 2K-polyurethane coating systems are now an alternative to corresponding solvent-containing systems. Hydroxyfunctional aqueous polyurethane dispersions which can be hardened with appropriate water-emulsifiable polyisocyanates have already been known for some time. However, in many cases the properties of the coating obtained in this manner are not sufficient especially with regard to water resistance and resistance to solvents and chemicals because additional hydrophilic groups are introduced into the system due to the use of these polyethylene glycol-modified polyisocyanates.

Although it is known from DE 198 47 077 A1 and DE 198 22 890 A1 that hydrophilized polyisocyanates containing allophanate groups have improved incorporation properties in hydroxyfunctional binders, some dispersions are in many cases not yet sufficiently compatible with some commercially available hydrophilized polyisocyanate hardeners especially in combination with certain solvents with the result that the hardener component can often only be homogenously dispersed in the aqueous resin component after a long period of intensive mechanical stirring or undesired opaqueness occurs in the coating. Furthermore the problem of limited pot life and the formation of reaction bubbles in the case of larger layer thicknesses has not yet been satisfactorily resolved.

Aqueous chemically post-cross-linked 2K-polyurethane coatings with free polyisocyanates (lacquer polyisocyanates) as the hardener component were described for the first time in EP 0 358 979 A1. Lacquer polyisocyanates are isocyanate-group-containing oligomeric derivatives of hexamethylene diisocyanate (HDI), isophorone diisocyanate (IPDI) and/or bis(isocyanatocyclohexyl)methane ($H_{12}MDI$) which contain urethane, biuret, uretdione and/or isocyanurate groups. However, as a result of their molecular weight, they have to be admixed with considerable amounts of organic solvents in order to achieve the required viscosity for processing.

EP 0 557 844 A1 describes a process for producing aqueous two-component polyurethane coating agents based on vinyl polymer polyols dispersed in an aqueous medium using external emulsifiers, said vinyl polymer polyols being synthesized by radical polymerization, and polyisocyanates emulsified in these dispersions.

Two-component binder combinations are described in EP 0 496 204 A1 which are composed of water-soluble or water-dispersible polyester resins containing urethane, carboxylate and hydroxyl groups as well as organic polyisocyanates which have to be hardened in paints or coating compounds at elevated temperatures (40-250° C.).

An aqueous hydroxyfunctional two-component polyurethane/polyacrylate hybrid system in conjunction with a water-dispersible polyisocyanate is described in EP 0 742 239 A1.

Two-component polyurethane coating compounds containing at least one reactive component which comprises an isocyanate group, a urethane, thiourethane or urea group and two capped groups that can react with isocyanate are disclosed in DE 195 24 046 A1.

Two-component polyurethane coating compounds are known from EP 0 839 846 A1 which consist of a dispersion of at least one polyhydroxy compound as the binder component and at least one monomeric diisocyanate finely dispersed in the dispersion as a hardener component.

WO 97/45475 A1 describes polyisocyanates having an average functionality of at least 2.0 as a hardener component for two-component polyurethane systems. According to EP 0 934 963 A1 a polyisocyanate component based on 2-methylpentane-1,5-diisocyanate is used.

Polyether-modified polyisocyanate mixtures having an improved water-dispersibility are described in DE 198 47 077

A1 and DE 199 29 784 A1 as a starting component for the production of PU plastics or as a cross-linking component for aqueous paint binders.

Special mixtures for two-component polyurethane covering varnishes for corrosion protection having a high solids content consisting of certain polyaspartic acid esters, polyaldimines, polyisocyanates and special additives are disclosed in DE 198 22 842 A1 and EP 0 959 086 A1.

Aqueous two-component polyurethane coating agents based on hydroxy-functional and/or aminofunctional water-dilutable resins and novel water-dispersible isocyanate-functional hardeners for lacquers, coatings and sealing compounds are claimed in EP 0 959 115 A1 and in DE 198 22 890 A1.

However, water-based two-component polyurethane coating systems in which low-molecular hydroxyfunctional and/or aminofunctional oligourethanes or polyurethanes are used almost exclusively as the binder component which, in combination with water-emulsifiable polyisocyanate hardeners, lead to highly cross-linked systems which have improved material and application properties were previously unknown.

Hence the object of the present invention was to develop an aqueous highly cross-linked two-component polyurethane coating system which does not have the said disadvantages of the prior art but rather has improved material and application properties and can also be produced with regard to ecological, economic and physiological aspects.

This object was achieved according to the invention by a) producing a binder component based on an aqueous solution or dispersion of low-molecular hydroxyfunctional and/or aminofunctional oligourethanes or polyurethanes wherein $a_1$) 10 to 50 parts by weight of a higher-molecular polyol component (A)(i) containing two or more hydroxyl groups that are reactive with polyisocyanates and having a molecular mass of 500 to 5000 Daltons and 0 to 5 parts by weight of a low-molecular polyol component (A)(ii) containing two or more hydroxyl groups that are reactive with polyisocyanates and having a molecular mass of 50 to 499 Daltons are partially or completely reacted with 2 to 20 parts by weight of a polyisocyanate component (B) consisting of at least one polyisocyanate, polyisocyanate derivative or polyisocyanate homologue containing two or more aliphatic or aromatic isocyanate groups with addition of 0 to 6 parts by weight of a solvent component (C) optionally in the presence of a catalyst, $a_2$) the polyurethane preadduct from step $a_1$) is reacted with 0.1 to 1.5 parts by weight of a low-molecular and anionically modifiable polyol component (A)(iii) containing two or more hydroxyl groups that are reactive with polyisocyanates and one or more inert carboxylic acid and/or sulfonic acid group(s) which can be partially or completely converted into carboxylate or sulfonate groups with the aid of bases or are already present in the form of carboxylate and/or sulfonate groups, having a molecular mass of 100 to 499 Daltons and/or with 0 to 8 parts by weight of a polymeric diol component (A)(iv) containing two or more hydroxyl groups that are reactive with polyisocyanates and other hydrophilic groups that are inert towards polyisocyanates having a molecular mass of 500 to 5000 Daltons optionally in the presence of a catalyst, $a_3$) the free isocyanate groups of the polyurethane prepolymer from step $a_2$) are completely or partially reacted with 0.1 to 15 parts by weight of a multifunctional chain stopping component (D) containing three or more hydroxyl groups and/or primary and/or secondary amino groups that are reactive with isocyanate groups and having a molecular mass of 50 to 500 Daltons, one of which reacts with the polyurethane preadduct, $a_4$) the multifunctional polyurethane oligomer or polymer from step $a_3$) is reacted with 0.1 to 1 parts by weight of a neutralization component (E) to partially or completely neutralize the acidic groups and subsequently $a_5$) the neutralized polyurethane oligomer or polymer from step $a_4$) is dispersed in 40 to 60 parts by weight water which also contains 0 to 50 parts by weight of a formulation component (F)

$a_6$) optionally the only partially chain-terminated polyurethane oligomer or polymer from step $a_5$) is also reacted with 0 to 15 parts by weight of a chain extension component (G) containing two or more primary and/or secondary amino groups that are reactive with isocyanate groups and having a molecular mass of 50 to 500 Daltons and b) by subsequently reacting the binder component from step $a_5$) or step $a_6$) with a cross-linking component (H) in a ratio of 3:1 to 5:1 in which water-dispersible polyisocyanates containing aliphatically and/or cycloaliphatically and/or aromatically bound isocyanate groups which can contain 0 to 20 parts by weight of an organic solvent are used as the cross-linking component (H).

It was surprisingly found that the hydroxyl groups and/or amino groups contained in the oligourethane or polyurethane polymer firstly considerably contribute to a non-ionic hydrophilization of the binder component which enables the anionic hydrophilization with salt groups to be reduced from commonly 40 to 50 meq/(100 g) solid resin to 10 to 20 meq/(100 g). In the subsequent cross-linking the hydroxyl groups and/or amino groups react with the isocyanate groups of the cross-linker component. The number of non-ionically hydrophilizing groups continuously decreases during the processing of the two-component system. Hence the resulting polyurethane polymer has only a very small proportion of anionic groups which results in a significantly reduced hydrophilicity of the final coating. The reduction of the stabilization of the binder during processing does not have a visible effect on the pot time. The cross-linking density can be adjusted as desired by means of the number of hydroxyl and/or amino groups contained in the binder component or by the choice of cross-linking component. High cross-linking densities result in coatings with a greatly improved resistance to chemicals. Moreover, as a result of the production process and the low-molecular mass of the binder component, strongly hydrophobic polymeric polyols can be used as polyurethane backbones without requiring large amounts of organic solvents to reduce the viscosity.

It has also surprisingly turned out that the cross-linking component, especially in the case of polyisocyanates without a permanent hydrophilic modification, can be very easily incorporated into the binder component by simple emulsifying techniques for example by using a mechanical stirrer or by simply manually mixing the two components which ensures a fine homogeneous dispersion of the polyisocyanate droplets in the binder component.

The aqueous highly cross-linked two-component polyurethane coating system according to the invention is defined by its multistep production process. In reaction step a) a solvent-free or low-solvent binder component based on an aqueous solution or dispersion of low-molecular hydroxyfunctional and/or aminofunctional oligourethanes or polyurethanes is firstly produced which is then further reacted in reaction step b) with a cross-linking component based on water-dispersible polyisocyanates to form an aqueous highly cross-linked two-component polyurethane coating system.

The binder component is produced with the aid of a modified prepolymer mixing process the so-called high solids process (HSP technology). High shear forces are not necessary for this so that for example high-speed mixers, disolvers or rotor/stator mixers can be used.

In order to carry out this process in reaction step $a_1$) 10 to 50 parts by weight of a higher-molecular polyol component (A)(i) and 0 to 5 parts by weight of a low-molecular polyol component (A)(ii) are reacted partially or completely using conventional techniques in polyurethane chemistry with 2 to 20 parts by weight of a polyisocyanate component (B) with addition of 0 to 6 parts by weight of a solvent component (C) optionally in the presence of a catalyst during which the hydroxyl groups of components (A)(i) and (A)(ii) react partially or completely with the isocyanate groups of component (B).

The production of the polyurethane preadduct according to reaction step $a_1$) is preferably carried out in such a manner that component (B) is added to or metered into the mixture of components (A)(i), (A)(ii) and (C) within a period of a few minutes to a few hours or alternatively the mixture of components (A)(i), (A)(ii) and (C) is added to or metered into component (B) within a period of a few minutes to a few hours. A solvent component (C) can be added in small amounts to reduce the viscosity in reaction step $a_1$).

The polyol component (A)(i) consists of a higher-molecular polyol containing two or more hydroxyl groups that are reactive with polyisocyanates and having an average molecular mass (number average) of 500 to 6000 Daltons. Suitable polymeric polyols that can be used are polyalkylene glycols, aliphatic or aromatic polyesters, polycaprolactones, polycarbonates, -polymethacrylate diols, -dihydroxyalkylpolydimethylsiloxanes, hydroxyfunctional macromonomers, hydroxyfunctional telechels, hydroxyfunctional epoxide resins having a molecular mass of 1000 to 3000 Daltons or suitable mixtures thereof.

Suitable polyalkylene glycols are for example polypropylene glycols, polytetramethylene glycols and polytetrahydrofurans, hydrophobically modified polyether polymers consisting of saponification-resistant block copolymers having an ABA, BAB or $(AB)_n$ structure in which A represents a polymer segment with hydrophobizing properties and B represents a polymer segment based on polypropylene oxide, hydrophobically modified polyether polyols consisting of saponification-resistant block copolymers having an $A_1A_2A_3$ or $(A_1A_2)_n$ structure in which A in each case represents polymer segments with hydrophobizing properties, hydrophobically modified random polyether polyols consisting saponification-resistant random copolymers comprising at least one hydrophobic alkylene oxide and propylene oxide.

Linear or difunctional hydrophobically modified polyether polymers consisting of saponification-resistant block copolymers having an ABA, BAB or $(AB)_n$ structure in which A represents a polymer segment with hydrophobizing properties and B represents a polymer segment based on polypropylene oxide having an average molecular mass (number average) or 1000 to 3000 Daltons are preferably used.

Suitable aliphatic or aromatic polyesters are for example condensates based on 1,2-ethanediol or ethylene glycol and/or 1,4-butanediol or 1,4-butylene glycol and/or 1,6-hexanediol or 1,6-hexamethylene glycol and/or 2,2-di-methyl-1,3-propanediol or neopentyl glycol and/or 2-ethyl-2-hydroxymethyl-1,3-propanediol or trimethylol propane and 1,6-hexanedioic acid or adipinic acid and/or 1,2-benzenedicarboxylic acid or phthalic acid and/or 1,3-benzenedicarboxylic acid or isophthalic acid and/or 1,4-benzenedicarboxylic acid or terephthalic acid and/or 5-sulfoisophthalic acid sodium or esters thereof and reaction products of epoxides and fatty acids. Linear or difunctional aliphatic or aromatic polyester polyols having an average molecular mass (number average) of 1000 to 3000 Daltons are preferably used.

Polycaprolactones based on caprolactone (CAPA types, Solvay Interox Ltd.), polycarbonates based on dialkylcarbonates and glycols (Desmophen 2020, Bayer AG) and combinations thereof (Desmophen C 200, Bayer AG) are also members of the polyester group. Linear or difunctional types having an average molecular mass (number average) of 1000 to 3000 Daltons are preferably used.

Linear or difunctional types having an average molecular mass (number average) of 1000 to 3000 Daltons are preferably used as , -polymethacrylate diols (TEGO® Diol BD 1000, TEGO® Diol MD 1000 N, TEGO® Diol MD 1000 X, Tego Chemie Service GmbH) and, -dihydroxyalkylpolydimethylsiloxanes.

Component (A)(ii) is composed of a low-molecular polyol containing two or more hydroxyl groups that are reactive with polyisocyanates and having an average molecular mass of 50 to 499 Daltons. The following can for example be used as suitable low-molecular polyols: 1,2-ethanediol or ethylene glycol, 1,2-propanediol or 1,2-propylene glycol, 1,3-propanediol or 1,3-propylene glycol, 1,4-butanediol or 1,4-butylene glycol, 1,6-hexanediol or 1,6-hexamethylene glycol, 2-methyl-1,3-propanediol, 2,2-dimethyl-1,3-propanediol or neopentyl glycol, 1,4-bis-(hydroxymethyl)-cyclohexane or cyclohexanedimethanol, 1,2,3-propanetriol or glycerol, 2-hydroxymethyl-2-methyl-1,3-propanol or trimethylolethane, 2-ethyl-2-hydroxymethyl-1,3-propanediol or trimethylolpropane, 2,2-bis-(hydroxymethyl)-1,3-propanediol or pentaerythritol. 1,4-Butanediol is preferably used.

The polyisocyanate component (B) is composed of at least one polyisocyanate, polyisocyanate derivative or polyisocyanate homologue containing two or more aliphatic or aromatic isocyanate groups. In particular the polyisocyanates that are well-known in polyurethane chemistry or combinations thereof are suitable. The following can for example be used as suitable aliphatic polyisocyanates: 1,6-diisocyanatohexane (HDI), 1-isocyanato-5-isocyanatomethyl-3,3,5-trimethyl-cyclohexane or isophorone diisocyanate (IPDI), bis-(4-isocyanatocyclo-hexyl)-methane ($H_{12}$MDI), 1,3-bis-(1-isocyanato-1-methyl-ethyl)-benzene (m-TMXDI) or industrial isomeric mixtures of the individual aromatic polyisocyanates. 2,4-Diisocyanatotoluene or toluene diisocyanate (TDI), bis-(4-isocyanatophenyl)-methane (MDI) and optionally higher homologues thereof (polymeric MDI) or industrial isomeric mixtures of the individual aromatic polyisocyanates can for example be used as suitable aromatic polyisocyanates. In addition the so-called lacquer polyisocyanates based on bis-(4-isocyanatocyclohexyl)-methane ($H_{12}$MDI), 1,6-diisocyanatohexane (HDI), 1-isocyanato-5-isocyanatomethyl-3,3,5-trimethyl-cyclohexane (IPDI) are also basically suitable. The term "lacquer polyisocyanates" characterizes derivatives of these diisocyanates having allophanate, biuretic, carbodiimide, isocyanurate, uretdione and urethane groups in which the residual content of monomeric diisocyanates has been reduced to a minimum in accordance with the prior art. In addition it is also possible to use modified polyisocyanates that can for example be prepared by hydrophilically modifying "lacquer polyisocyanates" based on 1,6-diisocyanatohexane (HDI). Aliphatic polyisocyanates are preferred over aromatic polyisocyanates. In addition polyisocyanates containing isocyanate groups of different reactivity are preferred.

The NCO/OH equivalent ratio of components (A) and (B) is adjusted to a value of 1.25 to 2.5, preferably 1.5 to 2.25.

Polyisocyanates containing isocyanate groups having different reactivities are preferably used to obtain narrower molecular mass distributions with less inhomogeneity. Correspondingly polyurethane prepolymers having a linear structure are preferred which are composed of difunctional polyol and polyisocyanate components. The viscosity of the polyurethane prepolymers is relatively low and substantially independent of the structure of the polyol and polyisocyanate components that are used.

The solvent component (C) is composed of at least one solvent that is inert towards polyisocyanates and is preferably completely or partially miscible with water, and which remains in the binder component after the production or is completely or partially removed by distillation. Suitable solvents are for example high-boiling and hydrophilic organic solvents such as N-methylpyrrolidone, diethylene glycol dimethyl ether, dipropylene glycol dimethyl ether (Proglyde DMM® from the Dow Company), low-boiling solvents such as acetone, butanone or any mixtures thereof. It is preferable to use a high-boiling and hydrophilic solvent such as N-methylpyrrolidone which remains in the dispersion after the manufacture and acts as a coalescing agent.

In the subsequent reaction step $a_2$) the partially or completely reacted polyurethane preadduct from step $a_1$) is reacted with 0.1 to 1.5 parts by weight of a low-molecular and anionically modifiable polyol component (A)(iii) and/or with 0 to 8 parts by weight of a polymeric diol component (A)(iv) optionally in the presence of a catalyst to form the corresponding polyurethane prepolymer.

The polyurethane prepolymer is preferably produced according to reaction step $a_2$) in such a manner that the finely ground polyol component (A)(iii) having an average particle size of <150 μm and the polymeric diol component (A)(iv) are added to or metered into the polyurethane preadduct from step $a_1$) within a period of a few minutes to a few hours. The polyurethane preadduct from step $a_1$) that is used in reaction step $a_2$) can optionally also still have free hydroxyl groups in addition to isocyanate groups and/or polyisocyanate monomers if the process is controlled appropriately or the reaction is incomplete.

The component (A)(iii) is composed of at least one low-molecular and anionically modifiable polyol containing one or more hydroxyl groups that are reactive with polyisocyanates and one or more carboxylic acid and/or sulfonic acid group(s) that are inert towards polyisocyanates which can be completely or partially converted into carboxylate and/or sulfonate groups in the presence of bases or are already present in the form of carboxylate and/or sulfonate groups and having a molecular mass of 100 to 499 Daltons. The following can for example be used as low-molecular and anionically modifiable polyols: hydroxypivalic acid (trade name HPA, Perstorp Specialty Chemicals AB), 2-hydroxymethyl-3-hydroxypropanoic acid or dimethylolacetic acid, 2-hydroxymethyl-2-methyl-3-hydroxypropanoic acid or dimethylolpropionic acid (trade name Bis-MPA, Perstorp Specialty Chemicals AB), 2-hydroxymethyl-2-ethyl-3-hydroxypropanoic acid or dimethylolbutyric acid, 2-hydroxymethyl-2-propyl-3-hydroxypropanoic acid or dimethylolvaleric acid, citric acid, tartaric acid [tris-(hydroxymethyl)-methyl]-3-aminopropanesulfonic acid (TAPS, Raschig GmbH), building blocks based on 1,3-propanesulfone (Raschig GmbH) and/or 3-mercaptopropanesulfonic acid, sodium salt (trade name MPS, Raschig GmbH). These building blocks can optionally also have amino groups instead of hydroxyl groups. Bishydroxyalkanecarboxylic acids and/or bishydroxysulfonic acids or alkali salts thereof having a molecular mass of 100 to 499 Daltons are preferably used and in particular 2-hydroxymethyl-2-methyl-3-hydroxypropanoic acid or dimethylolpropionic acid (trade name DMPA® from Trimet Technical Products Inc.).

The component (A)(iv) is composed of 0 to 8 parts by weight of a polymeric diol component containing two or more hydroxyl groups that are reactive with polyisocyanates and other hydrophilic groups that are inert towards polyisocyanates and having a molecular mass of 500 to 5000 Daltons. Reaction products of poly-(ethylene oxide[-co/block/ran-propylene oxide]-monoalkyl ethers, a diisocyanate and diethanolamine are preferably used.

The reaction conditions for carrying out reaction steps $a_1$) to $a_2$) is relatively uncritical. The reaction mixture in reaction steps $a_1$) and $a_2$) is stirred under an inert gas atmosphere while utilizing the exothermy of the polyaddition reaction until the calculated or theoretical NCO content is reached preferably at 60 to 120° C. and in particular at 80 to 100° C. The required reaction times are in the range of several hours and are mainly influenced by reaction parameters such as the reactivity of the components, the stoichiometry of the components and the temperature.

The conversion of components (A) and (B) in the reaction steps $a_1$) and/or $a_2$) can be carried out in the presence of a conventional catalyst for poly-addition reactions on polyisocyanates. These catalysts are added as required in amounts of 0.01 to 1% by weight based on the components (A) and (B). Common catalysts for polyaddition reactions on polyisocyanates are for example: dibutyltin oxide, dibutyltin dilaurate (DBTL), triethylamine, tin(II) octoate, 1,4-diazabicyclo[2,2,2]octane (DABCO), 1,4-diaza-bicyclo[3,2,0]-5-nonene (DBN), 1,5-diaza-bicyclo[5,4,0]-7-undecene (DBU).

The anionically modifiable polyurethane prepolymer from reaction step $a_2$) is completely or partially reacted in the subsequent reaction step $a_3$) with 0.1 to 15 parts by weight of a multifunctional chain stopper component (D) in which in each case only one reactive group or component (D) reacts with an isocyanate group of the polyurethane preadduct. The reaction step $a_3$) is preferably carried out at a temperature of 60 to 120° C. and in particular at 80 to 100° C.

The chain stopper component (D) is composed of a polyol, polyamine or polyaminoalcohol containing three or more hydroxyl and/or primary and/or secondary amino groups that are reactive with isocyanate groups and having a molecular mass of 50 to 500 Daltons, one of which reacts with the polyurethane preadduct. The following can for example be used as a suitable chain stopper component (D): diethanolamine, trimethylolpropane, ditrimethylolpropane, pentaerythritol, dipentaerythritol, carbohydrates and/or derivatives thereof. Aliphatic or cycloaliphatic polyols and/or polyamines and/or amino alcohols are preferably used and in particular diethanolamine and/or trimethylolpropane.

The chain stopper component (D) is used in such an amount that the degree of chain stopping based on the free isocyanate groups of the polyurethane prepolymer consisting of components (A) and (B) is 80 to 100 equivalent %.

The functionalized and anionically modifiable polyurethane oligomer or polymer from reaction step $a_3$) which has two or more reactive groups per chain end and a total functionality of 4 is reacted (direct neutralization) in the following reaction step $a_4$) with 2 to 20 parts by weight of a neutralization component (E) in order to partially or completely neutralize the carboxylic acid and/or sulfonic acid groups. The reaction step a$_4$) is preferably carried out at a temperature of 40 to 65° C. and in particular at ca. 50° C.

The neutralization component (E) is composed of one or more bases which are used to partially or completely neutralize the carboxylic acid and/or sulfonic acid groups. If the component (A)(iii) is already in the form of its salts, the neutralization component (E) can be omitted. The following can for example be used as suitable bases: tertiary amines such as N,N-dimethylethanolamine, N-methyldiethanolamine, triethanolamine, N,N-dimethylisopropanolamine, N-methyldiisopropanolamine, triisopropylamine, N-methylmorpholine, N-ethylmorpholine, triethylamine, ammonia or alkali hydroxides such as lithium hydroxide, sodium hydroxide, potassium hydroxide. Tertiary amines and in particular triethylamine are preferably used.

The neutralization component (E) is added in such an amount that the degree of neutralization based on the free carboxylic acid and/or sulfonic acid groups of the polyurethane oligomer or polymer consisting of components (A), (B) and (D) is 70 to 100 equivalent % and preferably 80 to 90 equivalent %. In the neutralization carboxylate and/or sulfonate groups which are used for the anionic modification or stabilization of the polyurethane dispersion are formed from the carboxylic acid and/or sulfonic acid groups.

The functionalized and anionically modified polyurethane oligomer or polymer from reaction step a$_4$) is dispersed in the following reaction step a$_5$) in 40 to 60 parts by weight water which can also contain 0 to 50 parts by weight of a formulation component (F) (in-situ formulation). The reaction step a5) is preferably carried out at a temperature of 30 to 50° C. and in particular at ca. 40° C. If required the water which may still contain the formulation component (F), can also be dispersed in the multifunctional and anionically modified polyurethane oligomer or polymer.

The reactions steps a$_4$) and a$_5$) can also be combined in such a manner that component (E) is added to water before dispersion (indirect neutralization). If required it is also possible to use a combination of direct and indirect neutralization.

During the dispersion the polyurethane prepolymer is transferred into the dispersion medium and forms an aqueous solution or dispersion of low-molecular hydroxyfunctional and/or aminofunctional oligourethanes or polyurethanes. In this process the anionically modified polyurethane oligomer or polymer either forms micelles which have stabilizing carboxylate and/or sulfonate groups on the surface and reactive isocyanate groups in the interior or is present dissolved in the aqueous phase. All cationic counterions to the anionic carboxylate and/or sulfonate groups are dissolved in the dispersion medium. The term "dispersion" also encompasses the presence of solvated and/or suspended components in addition to dispersed components having a micellar structure.

The degree of hardness of the water used for the process is unimportant and hence it is not necessary to use distilled or desalted water. High degrees of hardness further reduce the uptake of water by the aqueous highly cross-linked two-component polyurethane coating system without adversely affecting its material properties.

The formulation component (F) is composed of antifoaming agents, deaerators, lubricating and flow-control additives, radiation hardening additives, dispersing additives, substrate wetting additives, hydrophobizing agents, rheology additives such as polyurethane thickeners, coalescing agents, dulling agents, bonding agents, antifreeze agents, antioxidants, UV stabilizers, bactericides, fungicides, other polymers and/or polymer dispersions as well as fillers, pigments, dulling agents or suitable combinations thereof. The individual formulation components are to be regarded as being inert.

The functionalized and anionically modified polyurethane oligomer or polymer from reaction step a$_5$) which may be only partially chain stopped is reacted in the subsequent reaction step a$_6$) with 0 to 15 parts by weight of a chain extending component (G). The reaction step a$_6$) is preferably carried out at a temperature of 30 to 50° C. and in particular at ca. 40° C.

The reactions steps a$_5$) and a$_6$) can also be combined in such a manner that component (G) is added to water before dispersion.

The chain extending component (G) is composed of a polyamine having two or more amino groups that are reactive with polyisocyanates. The following can for example be used as suitable polyamines: adipinic acid dihydrazide, ethylene diamine, diethylene triamine, triethylene tetramine, tetraethylene pentamine, pentaethylene hexamine, dipropylene triamine, hexamethylene diamine, hydrazine, isophorone diamine, N-(2-aminoethyl)-2-aminoethanol, adducts of salts of 2-acrylamido-2-methylpropane-1-sulfonic acid (AMPS®) and ethylenediamine, adducts of salts of (meth)acrylic acid and ethylenediamine, adducts of 1,3-propanesulfone and ethylene diamine or any combination of these polyamines. Difunctional primary amines and in particular ethylene diamine are preferably used.

The chain extending component (G) is added in such an amount that the degree of chain extension based on the free isocyanate groups of the polyurethane oligomer or polymer comprising components (A), (B), (D) and (E) is 0 to 20 equivalent %. The chain extending component (G) can be diluted in previously removed portions of the water in a weight ratio of 1:1 to 1:10 in order to suppress additional exothermy due to the hydration of the amines.

The (partial) chain extension increases the molecular mass of the polyurethane oligomer or polymer. In this process the chain extending component (G) reacts with reactive isocyanate groups much more rapidly than water. After reaction step a$_6$) free isocyanate groups which may still be present are completely chain extended with water.

The solids content of the polyurethane oligomer or polymer comprising components (A), (B), (D), (E) and (G) is adjusted to 35 to 70% by weight, preferably 45 to 55% by weight based on the total amount of aqueous binder components consisting of components (A) to (E) and (G).

The average particle size of the micelles of the aqueous binder component consisting of components (A) to (E) and (G) is 10 to 300 nm, preferably 50 to 200 nm.

The average molecular mass of the polyurethane oligomer or polymer consisting of components (A), (B), (D), (E) and (G) is 1000 to 20,000 Daltons, preferably 2000 to 15,000 Daltons.

The content of carboxylate and/or sulfonate groups of the polyurethane oligomer or polymer consisting of components (A), (B), (D), (E) and (G) is adjusted to 5 to 25 meq $(100\,g)^{-1}$, preferably to 10 to 20 meq $(100\,g)^{-1}$.

The binder component is present in the form of a dispersion or molecularly dispersed solution of low-molecular hydroxyfunctional and/or aminofunctional oligourethanes or polyurethanes that can be diluted with water and are in a pH range of 6 to 9. They may also contain further water-dilutable organic polyhydroxy compounds such as water-soluble alcohols containing more than two hydroxyl groups such as glycerol, trimethylolpropane, 1,2,3-butanetriol, 1,2,6-hexanetriol, pentaerythritol or sugars which enables the technical paint properties of the hardened coating to be modified correspondingly.

These dispersions or solutions are stabilized by the presence of ionic hydrophilic groups such as carboxylate, sulfonate or other hydrophilic groups that are obtained by complete or partial neutralization of the corresponding acidic groups.

The binder component from reaction step $a_5$) or $a_6$) is finally reacted in reaction step b) with the optionally hydrophilically modified cross-linking component (H) in a ratio of 3:1 to 5:1 whereby the cross-linking component (H) is added to the binder component and after the application one obtains a highly cross-linked polyurethane coating system having a reduced hydrophilicity and improved resistance to chemicals. Reaction step b) is preferably carried out at a temperature of 20 to 40° C., in particular at ca. 20° C.

The cross-linking component (H) is composed of water-dispersible polyisocyanates containing aliphatically and/or cycloaliphatically and/or aromatically bound isocyanate groups and containing 0 to 20 parts by weight of an organic solvent. The aliphatic polyisocyanates are preferred over aromatic polyiso-cyanates. The "lacquer polyisocyanates" based on bis-(4-isocyanatocyclo-hexyl)-methane ($H_{12}$MD), 1,6-diisocyanatohexane (HDI), 1-isocyanato-5-isocyanatomethyl-3,3,5-trimethyl-cyclohexane (IPDI) or combinations thereof that are well-known in polyurethane chemistry are particularly suitable. The term "lacquer polyisocyanates" characterizes derivatives of these diisocyanates which have allophanate, biuret, carbodiimide, isocyanurate, uretdione, urethane groups in which the residual content of monomeric diisocyanates has been reduced to a minimum corresponding to the prior art. In addition it is also possible to use hydrophilically modified polyisocyanates which can for example be prepared by reacting "lacquer polyisocyanates" with polyethylene glycol. Commercial HDI isocyanurates without (trade name Rhodocoat WT 2102, Rhodia AG) or with a hydrophilic modification (trade name Basonat P LR 8878, BASF AG, trade name Desmodur DA or Bayhydur 3100 from Bayer AG) can be used for example as suitable polyisocyanates.

In order to produce the ready-to-use aqueous highly cross-linked two-component polyurethane coating agent, the cross-linking component (H) (hardener, part B) is mixed into the binder component consisting of components (A) to (G) (stock lacquer, part A) shortly before processing. In order to achieve a problem-free emulsification, it is recommended that the polyisocyanates are diluted with small amounts of organic solvent such as dipropylene glycol dimethyl ether (Proglyde DMM®), butyl(di)glycol acetate or butyl acetate. Usually simple emulsification techniques for example using a mechanical stirrer (drill with stirrer) are sufficient to achieve a homogeneous distribution of the components. In this connection the amounts of binder component and cross-linking component are such that the NCO/(OH+$NH_{(2)}$) equivalent ratio of the isocyanate groups of the cross-linking component and the hydroxyl and/or amino groups of the binder component is adjusted to 1.1 to 1.6 preferably 1.2 to 1.4.

In this manner transparent scratch-resistant coatings with excellent properties are achieved due to a high cross-linking density in conjunction with a reduced hydrophilicity. This applies to the working properties as well as to the mechanical properties and is associated with a very high resistance to solvents and chemicals. Due to the relatively low content of hydrophilic groups in the binder component, the coatings are also characterized by an excellent waterproofness.

The aqueous highly cross-linked two-component polyurethane coating systems according to the invention with a reduced hydrophilicity are applied using known methods from paint technology such as flow coating, pouring, knife coating, rolling, spraying, painting, immersing, rolling.

The coatings are generally dried and hardened at normal (outside and inside) temperatures in a range of 5 to 40° C. i.e. without specially heating the coating; but this can also be carried out at elevated temperatures in the range of 40 to 100° C. depending on the application.

Another subject matter of the present invention concerns the use of the aqueous highly cross-linked two-component polyurethane coating systems according to the invention in the building or industrial field as formulated or unformulated chemical-resistant and lightfast paint and/or coating systems for surfaces of mineral building materials such as concrete, plaster, ceramics, clay, cement as well as for surfaces of glass, rubber, wood and derived timber products, plastic, metal, paper, composite materials, leather or as a binder for hardening hydraulic binders.

The aqueous highly cross-linked two-component polyurethane coating systems proposed according to the invention are also suitable individually or in combination for the system construction of floor coverings for indoors, coatings for balconies or coverings for parking decks and multi-storey parking garages.

The invention is further illustrated by the following examples.

EXAMPLES

Example 1

Hydroxyfunctional Oligourethane Dispersions, Chain-Stopped with Trimethylpropane (TMP)

A mixture of 100.00 g Desmophen C 200 having a hydroxy number of 56 mg KOH $g^{-1}$ (Bayer AG) and 48.88 g isophorone diisocyanate (Vestanat® IPDI, Degussa AG) was stirred for 2 hours at 80-90° C. under a nitrogen atmosphere in the presence of 0.1 g dibutyl tin dilaureate (DBTL) as a catalyst in a four-necked flask fitted with a precision glass stirrer, reflux condenser, thermometer and nitrogen cover. After adding 2.76 g dimethylolpropionic acid (DMPA®), 1.93 g 1,4-butanediol and 15.0 g N-methylpyrrolidone (NMP) to the preadduct, the mixture was stirred further at 80 to 90° C. under a nitrogen atmosphere until the calculated NCO content was reached (theoretical value: 3.99% by weight). The course of the reaction was monitored acidimetrically.

Subsequently 24.13 g trimethylolpropane dissolved in 33.0 g N-methylpyrrolidone (NMP) was added and the mixture was stirred for a further 4 hours at 80-90° C. until the NCO value was reduced to zero.

After cooling to 60° C., the prepolymer was directly neutralized with 1.87 g triethylamine (TEA).

The prepolymer was then dispersed in 123.67 g water while stirring intensively.

A stable oligourethane dispersion having the following characteristics was obtained:

| | |
|---|---|
| appearance | milky-white fluid |
| solids content | 50% by weight |
| charge density | 10.05 meq $(100 \text{ g})^{-1}$ |
| functionality (OH) | 4 |

Example 2

Aqueous Highly Cross-Linked Two-Component Polyurethane Coating System Based on Example 1

A two-component polyurethane clear lacquer with an NCO/OH equivalent ratio of 1.3 is obtained by incorporating Rhodocoat WT 2102 which was previously mixed with dipropylene glycol dimethyl ether (Proglyde DMM®) with the aid of a mechanical stirrer (9:1).

| component | parts by weight | description |
|---|---|---|
| Part A | | |
| example 1 | 991.00 | oligourethane dispersion |
| Byk 024 | 3.00 | defoamer |
| Tego Wet 500 | 3.00 | wetting agent |
| Edaplan LA413 | 3.00 | flow additive |
| Total: | 1000.00 | stock lacquer |
| Part B | | |
| Rhodocoat WT 2102 (9:1 in Proglyde DMM) | 119.20 | water-dispersible polyisocyanate |
| Proglyde ® DMM | 13.22 | solvent |
| Total: | 132.42 | hardener |

Example 3

Hydroxyfunctional Oligourethane Dispersions, Chain-Stopped with Diethanolamine (DEA)

A mixture of 100.00 g Desmophen C 200 having a hydroxy number of 56 mg KOH g$^{-1}$ (Bayer AG) and 46.01 g isophorone diisocyanate (Vestanat® IPDI, Degussa AG) was stirred for 2 hours at 80-90° C. under a nitrogen atmosphere in the presence of 0.1 g dibutyl tin dilaureate (DBTL) as a catalyst in a four-necked flask fitted with a precision glass stirrer, reflux condenser, thermometer and nitrogen cover. After adding 3.48 g dimethylolpropionic acid (DMPA®), 2.48 g 1,4-butanediol and 15.16 g N-methylpyrrolidone (NMP) to the preadduct, the mixture was stirred further at 80 to 90° C. under a nitrogen atmosphere until the calculated NCO content was reached (theoretical value: 5.20% by weight). The course of the reaction was monitored acidimetrically.

After cooling to 60° C., the prepolymer was directly neutralized with 2.36 g triethylamine (TEA).

The prepolymer was then dispersed in 139.27 g water while stirring intensively and immediately chain-stopped with 21.76 g diethanolamine (DEA) (50% aqueous solution).

A stable polyurethane dispersion having the following characteristics was obtained:

| | |
|---|---|
| appearance | milky-white fluid |
| solids content | 50% by weight |
| charge density | 16.30 meq (100 g)$^{-1}$ |
| functionality (OH) | 4 |

Example 4

Aqueous Highly Cross-Linked Two-Component Polyurethane Coating System Based on Example 3

A two-component polyurethane clear lacquer with an NCO/OH equivalent ratio of 1.3 is obtained by incorporating Rhodocoat WT 2102 which was previously mixed with dipropylene glycol dimethyl ether (Proglyde DMM®) with the aid of a mechanical stirrer (9:1).

| component | parts by weight | description |
|---|---|---|
| Part A | | |
| example 3 | 991.00 | oligourethane dispersion |
| Byk 024 | 3.00 | defoamer |
| Tego Wet 500 | 3.00 | wetting agent |
| Edaplan LA 413 | 3.00 | flow additive |
| Total: | 1000.00 | stock lacquer |
| Part B | | |
| Rhodocoat WT 2102 (9:1 in Proglyde DMM) | 119.20 | water-dispersible polyisocyanate |
| Proglyde ® DMM | 13.22 | solvent |
| Total: | 132.42 | hardener |

Example 5

Examination of the Technical Application Properties of Examples 2 and 4

The aqueous two-component polyurethane coatings were applied to polyester foils (wet film thickness 150 μm) by means of a doctor knife. Subsequently the films were dried at room temperature. After 7 days the pendulum damping was determined according to König (DIN 53 157). The resistance to water and various solvents and the film transparency was also tested after 7 days drying. The film was visually assessed.

The results of the examination are listed individually in the following table.

| Test | Drying | Example 2 | Example 4 |
|---|---|---|---|
| pendulum hardness according to Konig [s] | 7 d RT | 106 | 108 |
| film transparency | 7 d RT | clear | clear |
| water resistance[1] (30 min exposure) | 7 d RT | 0 | 0 |
| isopropanol/water[1] (10 min exposure) | 7 d RT | 0 | 0 |
| ethanol/water[1] (10 min exposure | 7 d RT | 0 | 0 |
| acetone[1] (10 min exposure) | 7 d RT | 0 | 0 |

[1] 0 = best result (no finding)
6 = worst result (film completely detached)

The invention claimed is:

1. An aqueous cross-linked two-component polyurethane coating system formed by a process comprising:
    a) producing a binder component based on an aqueous solution or dispersion of hydroxyfunctional and/or aminofunctional oligourethanes or polyurethanes, wherein
        a$_1$) forming polyurethane preadduct by reacting 10 to 50 parts by weight of a higher-molecular weight polyol component (A)(i) containing two or more hydroxyl groups that are reactive with polyisocyanates and having a molecular mass of 500 to 5000 Daltons and 0 to 5 parts by weight of a low-molecular weight polyol component (A)(ii) containing two or more hydroxyl groups that are reactive with polyisocyanates and having a molecular mass of 50 to 499 Daltons with 2 to 20 parts by weight of a polyisocyanate component (B) comprising at least one polyisocyanate, polyisocyanate derivative or polyisocyanate homologue containing two or more aliphatic or aromatic isocyanate groups with addition of 0 to 6 parts by weight of a solvent component (C), components A and B having an NCO/OH equivalent ratio of 1.25:1 to 2.5:1;

$a_2$) forming polyurethane prepolymer by reacting the polyurethane preadduct formed in step $a_1$) with 0.1 to 1.5 parts by weight of a low-molecular weight and anionically modifiable polyol component (A)(iii) containing one or more hydroxyl groups that are reactive with polyisocyanates and one or more inert carboxylic acid and/or sulfonic acid group(s) which can be partially or completely converted into carboxylate or sulfonate groups in the presence of bases or are already present in the form of carboxylate and/or sulfonate groups, having a molecular mass of 100 to 499 Daltons and with 0 to 8 parts by weight of a hydroxy functional component (A)(iv) containing two or more hydroxyl groups that are reactive with polyisocyanates and other hydrophilic groups that are inert towards polyisocyanates having a molecular mass of 500 to 5000 Daltons;

$a_3$) forming a multifunctional polyurethane oligomer or polymer by reacting the free isocyanate groups of the polyurethane prepolymer from step $a_2$) with 0.1 to 15 parts by weight of a multifunctional chain stopping component (D) containing three or more hydroxyl groups and/or primary and/or secondary amino groups that are reactive with isocyanate groups and having a molecular mass of 50 to 500 Daltons, one of the hydroxyl groups or one of the amino groups reacts with the polyurethane preadduct, the chain stopping component being in an amount that there is no unreacted polyol in $a_3$ in addition to the oligomer from step $a_2$ and wherein water dispersion of $a_3$ is achieved with conversion and hydrophilization to a salt of not more than about 20 meq/(100)g solid resin of ionic groups;

$a_4$) reacting the multifunctional polyurethane oligomer or polymer from step $a_3$) with 0.1 to 1 parts by weight of a neutralization component (E) to partially or completely neutralize the acidic groups and to form neutralized polyurethane oligomer or polymer; and $a_5$) dispersing the neutralized polyurethane oligomer or polymer from step $a_4$) in 40 to 60 parts by weight of water which also contains 0 to 50 parts by weight of a formulation component (F) to form a binder component; and b) reacting the binder component from step $a_5$) with a cross-linking component (H) in a ratio of 3:1 to 5:1, wherein the cross-linking component (H) comprises water-dispersible polyisocyanates containing aliphatically and/or cycloaliphatically and/or aromatically bound isocyanate groups which can contain 0 to 20 parts by weight of an organic solvent.

2. An aqueous cross-linked two-component polyurethane coating system formed by a process comprising:

a) producing a binder component based on an aqueous solution or dispersion of hydroxyfunctional and/or aminofunctional oligourethanes or polyurethanes, wherein $a_1$) forming polyurethane preadduct by reacting 10 to 50 parts by weight of a higher-molecular weight polyol component (A)(i) containing two or more hydroxyl groups that are reactive with polyisocyanates and having a molecular mass of 500 to 5000 Daltons and 0 to 5 parts by weight of a low-molecular weight polyol component (A)(ii) containing two or more hydroxyl groups that are reactive with polyisocyanates and having a molecular mass of 50 to 499 Daltons with 2 to 20 parts by weight of a polyisocyanate component (B) comprising at least one polyisocyanate, polyisocyanate derivative or polyisocyanate homologue containing two or more aliphatic or aromatic isocyanate groups with addition of 0 to 6 parts by weight of a solvent component (C), components A and B having an NCO/OH equivalent ratio of 1.25:1 to 2.5:1;

$a_2$) forming polyurethane prepolymer by reacting the polyurethane preadduct formed in step $a_1$) with 0.1 to 1.5 parts by weight of a low-molecular weight and anionically modifiable polyol component (A)(iii) containing one or more hydroxyl groups that are reactive with polyisocyanates and one or more inert carboxylic acid and/or sulfonic acid group(s) which can be partially or completely converted into carboxylate or sulfonate groups in the presence of bases or are already present in the form of carboxylate and/or sulfonate groups, having a molecular mass of 100 to 499 Daltons and with 0 to 8 parts by weight of a hydroxy functional component (A)(iv) containing two or more hydroxyl groups that are reactive with polyisocyanates and other hydrophilic groups that are inert towards polyisocyanates having a molecular mass of 500 to 5000 Daltons;

$a_3$) forming a multifunctional polyurethane oligomer or polymer by reacting the free isocyanate groups of the polyurethane prepolymer from step $a_2$) with 0.1 to 15 parts by weight of a multifunctional chain stopping component (D) containing three or more hydroxyl groups and/or primary and/or secondary amino groups that are reactive with isocyanate groups and having a molecular mass of 50 to 500 Daltons, one of the hydroxyl groups or one of the amino groups reacts with the polyurethane preadduct, the chain stopping component being in an amount that there is no unreacted polyol in $a_3$ in addition to the oligomer from step $a_2$ and wherein water dispersion of $a_3$ is achieved with conversion and hydrophilization to a salt of not more than about 20 meq/(100)g solid resin of ionic groups, and the hydroxyl and/or amino groups reducing an amount of anionic hydrophilization groups needed to disperse the binder in an aqueous media by at least 50% as compared to a binder not made according to $a_1$ through $a_3$;

$a_4$) reacting the multifunctional polyurethane oligomer or polymer from step $a_3$) with 0.1 to 1 parts by weight of a neutralization component (E) to partially or completely neutralize the acidic groups and to form neutralized polyurethane oligomer or polymer; and $a_5$) dispersing the neutralized polyurethane oligomer or polymer from step $a_4$) in 40 to 60 parts by weight of water which also contains 0 to 50 parts by weight of a formulation component (F) to form a binder component, the neutralized polyurethane oligomer or polymer forming micelles having average particle size of from 10 nm to 300 nm in the water; and b) reacting the binder component from step $a_5$) with a cross-linking component (H) in a ratio of 3:1 to 5:1, wherein the cross-linking component (H) comprises water-dispersible polyisocyanates containing aliphatically and/or cycloaliphatically and/or aromatically bound isocyanate groups which can contain 0 to 20 parts by weight of an organic solvent.

3. The polyurethane coating system as claimed in claim 2, further comprising:
   $a_6$) reacting partially chain-terminated polyurethane oligomer or polymer from step $a_5$) with 0 to 15 parts by weight of a chain extending component (G) containing two or more primary and/or secondary amino groups that are reactive with isocyanate groups and having a molecular mass of 50 to 500 Daltons.

4. The polyurethane coating system as claimed in claim 2, wherein the higher-molecular weight polyol component (A)(i) comprises polyalkylene glycols, aliphatic or aromatic polyesters, polycaprolactones, polycarbonates, α, ω-polymethacrylatediols, α, ω-dihydroxyalkylpoly- dimethylsiloxanes, hydroxyfunctional macro-monomers, hydroxyfunctional telechels, hydroxyfunctional epoxide resins having a molecular mass of 1000 to 3000 Dalton or suitable mixtures thereof.

5. The polyurethane coating system as claimed claim 2 wherein the component (A)(i) is linear or difunctional hydrophobically modified polyether polyols comprising saponification-resistant block copolymers having an ABA, BAB or $(AB)_n$ structure in which A represents a polymer segment with hydrophobizing properties and B represents a polymer segment based on polypropylene oxide having an average molecular mass or 1000 to 3000 Daltons.

6. The polyurethane coating system as claimed in claim 2, wherein the component (A)(ii) is 1,4-butanediol.

7. The polyurethane coating system as claimed in claim 2, wherein the component (A)(iii) comprises a bishydroxyalkanecarboxylic acid and/or bishydroxysulfonic acid or alkali salts thereof having a molecular mass of 100 to 499 Daltons.

8. The polyurethane coating system as claimed in claim 7, wherein the bishydroxyalkanecarboxylic acid comprises 2-hydroxymethyl-2-methyl-3-hydroxypropionic acid or dimethylol-propionic acid.

9. The polyurethane coating system as claimed in claim 2, wherein the component (A)(iv) comprises reaction products of poly(ethylene oxide[-co/block/ran-propylene oxide])-monoalkyl ethers, a diisocyanate and diethanolamine.

10. The polyurethane coating system as claimed in claim 2, wherein the multi-functional chain-stopper component (D) comprises aliphatic of cycloaliphatic polyols and/or polyamines and/or amino-alcohols.

11. The polyurethane coating system as claimed in claim 10, wherein the multi-functional chain-stopper component (D) comprises diethanolamine and/or trimethylolpropane.

12. The polyurethane coating system as claimed in claim 2, wherein the formulation component (F) comprises antifoaming agents, deaerators, lubricating and flow-control additives, radiation hardening additives, dispersing additives, substrate wetting additives, hydrophobizing agents, rheology additives such as polyurethane thickeners, coalescing agents, dulling agents, bonding agents, antifreeze agents, antioxidants, UV stabilizers, bactericides, fungicides, other polymers and/or polymer dispersions as well as fillers, pigments, dulling agents or suitable combinations thereof.

13. The polyurethane coating system as claimed in claim 2, wherein the cross-linking component (H) comprises water-dispersible polyisocyanates containing aliphatically and/or cycloaliphatically and/or aromatically bound isocyanate groups which contain 0 to 20 parts by weight of an organic solvent.

14. The polyurethane coating system as claimed in claim 2 wherein the NCO/OH equivalent ratio of components (A) and (B) is adjusted to a value of 1.5:1 to 2.25:1.

15. The polyurethane coating system as claimed in claim 2, wherein the reactions of steps $a_1$) and $a_2$) are carried out in the presence of 0.01 to 1 weight % based on the components (A) and (B) of a conventional catalyst for polyaddition reactions on polyisocyanates.

16. The polyurethane coating system as claimed in claim 2, wherein the chain-stopper component (D) is added in such an amount that the degree of chain termination based on the free isocyanate groups of the polyurethane prepolymer comprising components (A) and (B) is 80 to 100 equivalent %.

17. The polyurethane coating system as claimed in claim 2, wherein the neutralization component (E) is added in such an amount that the degree of neutralization based on the free carboxylic acid and/or sulfonic acid groups of the polyurethane oligomer or polymer consisting of components (A), (B) and (D) is 70 to 100 equivalent %.

18. The polyurethane coating system as claimed in claim 17, wherein the degree of neutralization is 80 to 90 equivalent %.

19. The polyurethane coating system as claimed in claim 3, wherein the chain extending component (G) is added in such an amount that the degree of chain extension based on the free isocyanate groups of the polyurethane oligomer or polymer consisting of components (A), (B), (D) and (E) is 0 to 20 equivalent %.

20. The polyurethane coating system as claimed in claim 19, wherein the solids content of polyurethane oligomer or polymer comprising components (A), (B), (D), (E) and (G) is adjusted to 35 to 70 weight %, based on the total amount of the aqueous binder component consisting of components (A) to (E) and (G).

21. The polyurethane coating system as claimed in claim 20, wherein the solids content is adjusted to 45 to 55 weight %.

22. The polyurethane coating system as claimed in claim 20, wherein an average particle size of micelles of the aqueous binder component comprising components (A) to (E) and (G) is 10 to 300 nm.

23. The polyurethane coating system as claimed in claim 2, wherein the polyurethane oligomer or polymer consisting of the components (A), (B), (D), (E) and (G) has an average molecular mass of 1000 to 20,000 Daltons.

24. The polyurethane coating system as claimed in claim 2, wherein the NCO/(OH+NH$_{(2)}$)-equivalent ratio of the isocyanate groups of the cross-linking component and the hydroxyl and/or amino groups of the binder component is adjusted to 1.1 to 1.6.

25. The polyurethane coating system as claimed in claim 24, wherein the NCO/(OH+NH$_{(2)}$)-equivalent ratio is 1.2 to 1.4.

26. A method of producing the aqueous two-component polyurethane coating system of claim 2, comprising
   $a_1$) reacting the components (A)(i), (A)(ii), (B) and (C) to form a polyurethane preadduct during which reacting the hydroxyl groups of components (A)(i) and (A)(ii) with the isocyanate groups of component (B);
   $a_2$) reacting the polyurethane preadduct from reaction step $a_1$) with components (A)(iii) and (A)(iv) to form an anionically modifiable polyurethane prepolymer;
   $a_3$) reacting the anionically modifiable polyurethane prepolymer from reaction step $a_2$) with component (D) to form a functionalized and anionically modifiable polyurethane oligomer or polyurethane polymer so that in each case only one reactive group of component (D) reacts with one isocyanate group of the polyurethane preadduct;

$a_4$) reacting the functionalized and anionically modifiable polyurethane oligomer or polyurethane polymer from reaction step $a_3$) which has two or more reactive groups per chain end and a total functionality of 4 with component (E) for partial or complete neutralization to form a binder component;

$a_5$) dispersing the functionalized and anionically modifiable polyurethane oligomer or polyurethane polymer from reaction step $a_4$) in water; and b) reacting the binder component from reaction step $a_5$) with the modified cross-linking component (H), the cross-linking component (H) being added to the binder component, and obtaining a cross-linked, water proof and chemical resistant polyurethane coating system.

27. The method of claim 26, wherein in step $a_5$) the water also contains the component (F).

28. The method of claim 26, further comprising:

$a_6$) reacting the only partially chain-stopped, functionalized and anionically modified polyurethane oligomer or polyurethane polymer from step $a_5$) with component (G).

29. The method of claim 26, wherein steps $a_4$) and $a_5$) are combined in such a manner that component (E) is added to the water before dispersion.

30. The method of claim 26, wherein steps $a_4$) and $a_5$) are combined in such a manner that component (G) is added to the water before dispersion.

31. The method of claim 26, wherein steps $a_1$) and $a_3$) are carried out at a temperature of 60 to 120° C.

32. The method of claim 31, wherein steps $a_1$) and $a_3$) are carried out at a temperature of 80 to 100° C.

33. The method of claim 26, wherein step $a_4$) is carried out at a temperature of 40 to 65° C.

34. The method of claim 33, wherein step $a_4$) is carried out at 50° C.

35. The method of claim 26, wherein step b) is carried out at a temperature of 20 to 40° C.

36. The method of claim 35, wherein step b) is carried out at a temperature of 20° C.

37. A coating for surfaces, comprising the aqueous two-component polyurethane coating system of claim 2, wherein the coating is a formulated chemical-resistant and lightfast paint effective for coating surfaces selected from the group consisting of concrete, plaster, ceramics, clay, cement, glass, rubber, wood, derived timber products, plastic, metal, paper, composite materials, and leather.

38. Construction coating material comprising the aqueous two-component polyurethane coating system of claim 2, individually or in combination, wherein the material is used for coating indoor floors, balconies, parking decks and multi-story parking garages.

39. A coating for surfaces, comprising the aqueous two-component polyurethane coating system of claim 2, wherein the coating is an unformulated chemical-resistant and lightfast paint effective for coating surfaces selected from the group consisting of concrete, plaster, ceramics, clay, cement, glass, rubber, wood, derived timber products, plastic, metal, paper, composite materials, and leather.

40. The aqueous cross-linked two-component polyurethane coating system as recited in claim 2 wherein the hydroxyl and/or amino groups reduce the amount of anionic hydrophilization groups needed to disperse the binder in an aqueous media by 50% to 80% as compared to a binder not made according to $a_1$ through $a_3$.

41. The aqueous cross-linked two-component polyurethane coating system as recited in claim 2 wherein the hydroxyl and/or amino groups reduce the amount of anionic hydrophilization groups needed to disperse the binder in an aqueous media by 50% to 75% as compared to a binder not made according to $a_1$ through $a_3$.

* * * * *